United States Patent
Odate

(10) Patent No.: US 9,248,797 B2
(45) Date of Patent: Feb. 2, 2016

(54) SEAT BELT DEVICE

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/607,370

(22) Filed: Jan. 28, 2015

(65) Prior Publication Data

US 2015/0210236 A1     Jul. 30, 2015

(30) Foreign Application Priority Data

Jan. 30, 2014    (JP) .................................. 2014-015421

(51) Int. Cl.
*B60R 22/46*     (2006.01)
*B60R 21/017*    (2006.01)
*H02P 7/28*      (2006.01)
*H02P 29/02*     (2006.01)
*B60R 21/01*     (2006.01)

(52) U.S. Cl.
CPC ................ *B60R 21/017* (2013.01); *B60R 22/46* (2013.01); *H02P 7/28* (2013.01); *H02P 29/021* (2013.01); *B60R 2021/01184* (2013.01); *B60R 2021/01286* (2013.01); *B60R 2022/4666* (2013.01)

(58) Field of Classification Search
None
See application file for complete search history.

(56) References Cited

U.S. PATENT DOCUMENTS

| 5,216,284 | A | * | 6/1993 | Mattes et al. | ............... 307/10.1 |
| 2003/0226704 | A1 | * | 12/2003 | Aoki et al. | ..................... 180/271 |
| 2006/0087108 | A1 | * | 4/2006 | Midorikawa | .................. 280/806 |

FOREIGN PATENT DOCUMENTS

JP     2003-160024     6/2003

* cited by examiner

*Primary Examiner* — Adam Alharbi
(74) *Attorney, Agent, or Firm* — Rankin, Hill & Clark LLP

(57) ABSTRACT

A seat belt device includes a belt reel on which a webbing is wound, an electric brush motor for driving the belt reel, a motor control part that performs drive control of the electric brush motor, a voltage detecting part that detects a voltage generated between both terminals of the electric brush motor, and a failure determining part that determines whether the electric brush motor has failed or not on the basis of the presence or absence of a voltage having a frequency component caused by the drive control of the electric brush motor that is detected by the voltage detecting part while the electric brush motor is driven by the motor control part.

12 Claims, 11 Drawing Sheets

(BEFORE FILTERING)

(AFTER FILTERING)

SEAT BELT DEVICE

FIELD OF THE INVENTION

The present invention relates to an improvement in a seat belt device.

BACKGROUND OF THE INVENTION

Japanese Patent Application Laid-open Publication (JP-A) No. 2003-160024 discloses a seat belt device configured to enable a passenger to confirm a failure occurring in a pretensioner motor and the like. The disclosed seat belt device includes a motor, a motor driving means, a driving force transmitting means, and a failure determining means. The failure determining means determines the presence or absence of a motor failure on the basis of a current waveform generated when the motor driving means drives the motor while the driving force transmitting means interrupts transmission of a driving force from the motor to a seat belt wind-up device.

In the seat belt device shown in JP 2003-160024 A, detection of a motor failure is started and performed when an ignition switch is turned on, when a driver's-side door switch is turned on, or when depression of a brake pedal is detected. Due to a relatively few motor-failure detection opportunities, it may occur that a passenger cannot be restrained by a seat belt due to a motor failure occurring when an emergency condition happens on the vehicle.

With the foregoing prior problem in view, an object of the present invention is to provide a seat belt device which is capable of appropriately detecting a motor failure.

SUMMARY OF THE INVENTION

According to one aspect of the present invention, there is provided a seat belt device comprising: a belt reel on which a webbing is wound; an electric brush motor for driving the belt reel; a motor control part that performs drive control of the electric brush motor; a voltage detecting part that detects a voltage generated between both terminals of the electric brush motor; and a failure determining part that determines whether the electric brush motor has failed or not on the basis of the presence or absence of a voltage having a frequency component caused by the drive control of the electric brush motor that is detected by the voltage detecting part while the electric brush motor is driven by the motor control part.

With this arrangement, failure determination can be achieved in any timing as long as the electric brush motor is being driven. This means that opportunity to conduct failure detection for the electric brush motor greatly increases and motor failure determination can be achieved appropriately with increased reliability.

Preferably, the voltage having the frequency component is a ripple voltage.

In one preferred form of the invention, the failure determining part determines that a short-circuit failure has occurred in relation to connection between the electric brush motor and the motor control part when a constant ripple voltage larger than zero is detected by the voltage detecting part.

Preferably, the failure determining part determines that an open failure has occurred in relation to connection between the motor control part and the electric brush motor when a voltage value of zero is detected by the voltage detecting part.

With this arrangement, the failure determination can be achieved less costly with increased efficiency and in a short time.

Preferably, the failure determining part filters the ripple voltage and determines whether the electric brush motor has failed or not on the basis of a waveform of the filtered ripple voltage. The failure determination using such filtered voltage waveform offers a substantial cost reduction.

The seat belt device may further comprise a vehicle state detecting part that detects a state of a vehicle in which the seat belt device is incorporated, wherein the failure determining part determines whether the electric brush motor has failed or not when the vehicle state detecting part detects an action to fit the webbing or an action to take up a slack of the webbing in a condition where acceleration equal to or more than a predetermined value is not generated on the vehicle. With this arrangement, the electric brush motor is prevented from being driven with large current which would otherwise occur when an emergency condition happens on the vehicle.

DETAILED DESCRIPTION OF THE PREFERRED EMBODIMENTS

Certain preferred structural embodiments of the present invention will be described in detail below, by way of example only, with reference to the accompanying sheets of drawings.

1. Structure and Arrangement

Figure 1:
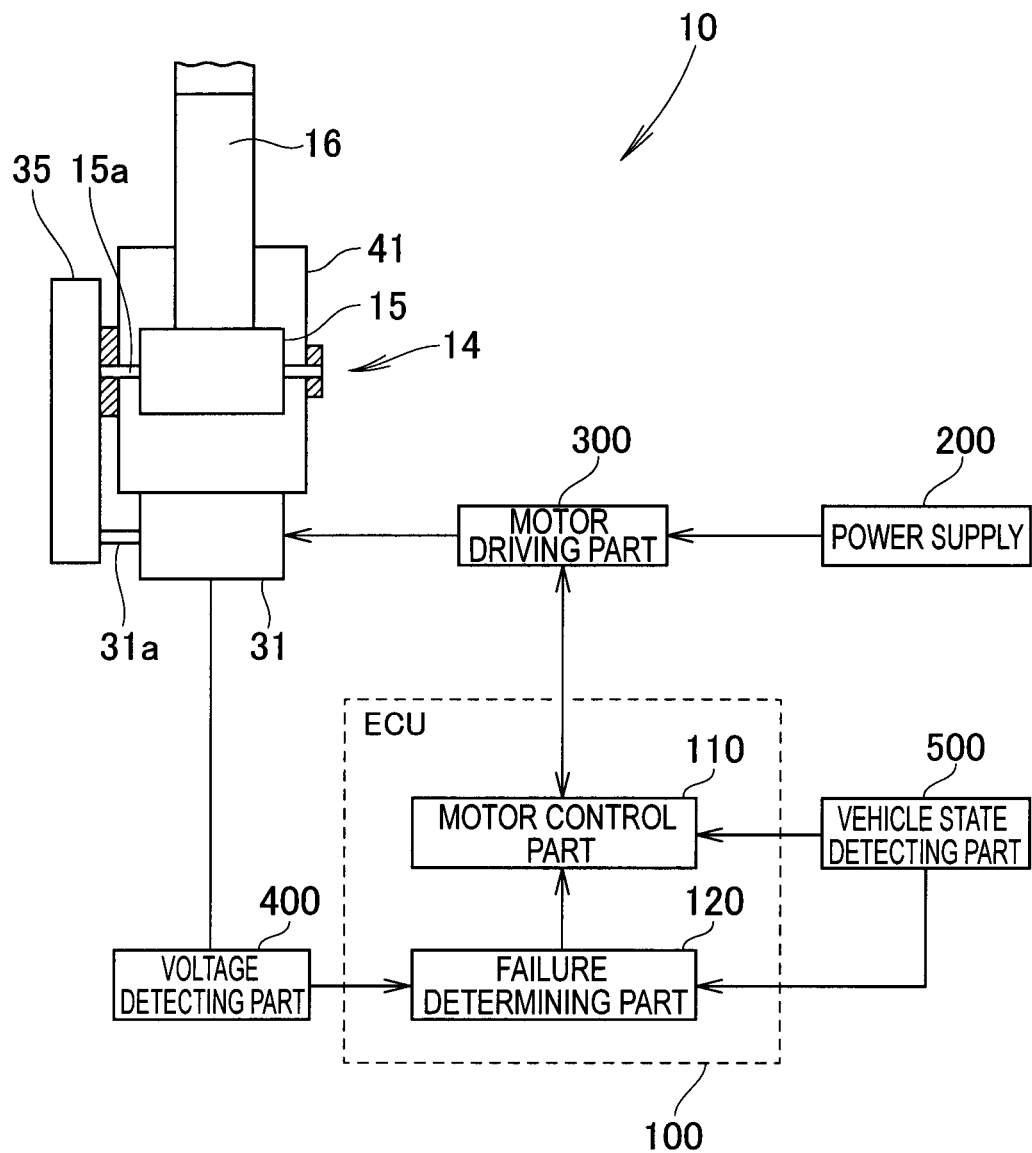
FIG. 1 is a block diagram showing a configuration of a seat belt device according to a preferred embodiment of the present invention.

FIG. 1 shows in block diagram a structure of a seat belt device according to an embodiment of the present invention. The seat belt device 10 generally comprises an ECU (Electronic Control Unit) 100 including a motor control part 110 and a failure determining part 120, a retractor 14 composed of, for example, a belt reel 15 and an electric brush motor 31, and a webbing 16. The motor control part 110 of the seat belt device 10 may control a motor driving part 300 such that electric power supplied from a power supply 200 is supplied to the electric brush motor 31. A shaft 15a of the belt reel 15 may be connected to a drive shaft 31a of the electric brush motor 31 via a motor driving mechanism 35. The belt reel 15 may be rotatably mounted in a frame 41 of the retractor 14.

The ECU 100 is constituted by a microcomputer, for example. A terminal voltage of the electric brush motor 31 detected by a voltage detecting part 400 and state information of a vehicle detected by a vehicle state detecting part 500 are supplied to the ECU 100 as information for the failure determination of the electric brush motor 31. The term "state information of the vehicle" as used herein refers to a state in which acceleration equal to or more than a predetermined value is generated on the vehicle and an operation in emergency is taken to avoid collision or reduce collision impact (this state being referred to as "pre-crash" state), or a state in which the vehicle is running while giving priority to the passenger's fitting comfort when a passenger takes an action to fit the webbing 16 or an action to take up a slack of the webbing 16 in a condition where acceleration equal to or more than the predetermined value is not generated on the vehicle (this state being referred to as "comfort" state). The vehicle state detecting part 500 also detects an ON/OFF state of a buckle switch 27, a vehicle speed, acceleration and other pieces of information, Though not shown, the ECU 100 may further includes, additional to the motor control part 110 and the failure determining part 120, a storage part, an input/output interface part and the like. The input/output interface part is connectable to an SRS (Supplement Restraint System) unit, not shown, where the ECU 100 can receive an operation signal from the SRS unit. Furthermore, the input/output interface part can receive an operating signal from a VSA (Vehicle Stability Assist) unit, not shown, and an operation signal from an ACC (Adaptive Cruse Control) unit, not shown.

The motor control part 110 controls the motor driving part 300 in such a manner as to perform current feedback control. In the current feedback control performed by the motor control part 110, a driving current value for the electric brush motor 31 is made coincident with a current value set in advance to ensure that the electric brush motor 31 rotates to wind up the webbing 16 until the webbing 16 is stretched with a prescribed tension. More specifically, the motor control part 110 calculates a duty ratio required for matching the driving current value for the electric brush motor 31 to be fed back, with the preset current value and controls the motor driving part 300 such that the electric power from the power supply 200 is supplied to the electric brush motor 31 for a duty-on time period. When a driving current value fed back from the motor driving part 300 is below the preset current value, the motor control part 100 calculates a duty ratio higher than the current duty ratio. Alternatively, when the driving current value fed back from the motor driving part 300 exceeds the preset current value, the motor control part 100 calculates a duty ratio lower than the current duty ratio.

The electric brush motor 31, due to its structure, is influenced by brushes and involves a ripple noise (ripple voltage) generated when current is switched by the brushes. With a particular attention given to this phenomenon, the seat belt device 10 is configured to perform a failure determination in any timing as long as the electric brush motor 31 is rotatably driven. To this end, the failure determining part 120 determines whether the electric brush motor 31 has failed or not on the basis of the presence or absence of a voltage having a frequency component (ripple noise) caused by the drive control of the electric brush motor 31 that is detected by the voltage detecting part 400 while the electric brush motor 31 is driven by the motor control part 110.

When a constant ripple voltage larger than zero is detected by the voltage detecting part 400, the failure determining part 120 may determine that a short-circuit failure has occurred in relation to connection between the electric brush motor 31 and the motor control part 110. Furthermore, when a voltage value of zero is detected by the voltage detecting part 400, the failure determining part 120 may determine that an open failure has occurred in relation to connection between the motor control part 110 and the electric brush motor 31.

The failure determining part 120 filters the ripple voltage detected by the voltage detecting part 400 and determines whether the electric brush motor 31 has failed or not on the basis of a waveform of the filtered ripple voltage. Furthermore, the failure determining part 120 determines whether the electric brush motor 31 has failed or not when the vehicle state detecting part 500 detects an action to fit the webbing 16 or an action to take up a slack of the webbing 16 in a condition where acceleration equal to or more than a predetermined value is not generated on the vehicle. The failure determination of the electric brush motor 31 is performed, for example, via a comparison of a filtered voltage waveform with a threshold value, or a frequency analysis.

Figure 2:
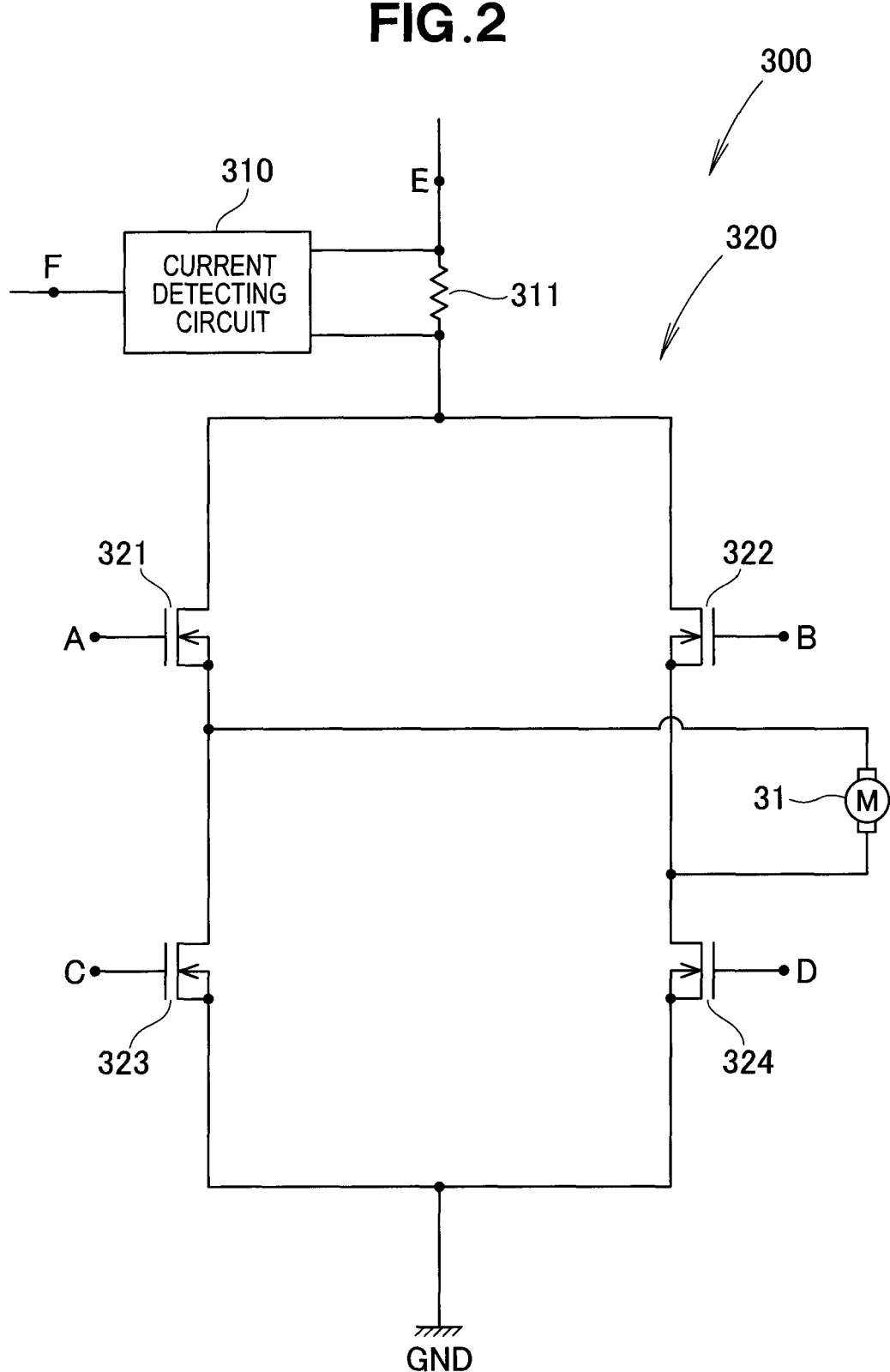
FIG. 2 is a view showing a configuration of a motor driving part of the seat belt device.

FIG. 2 is a circuit diagram of the motor driving part 300. As shown in FIG. 2, the motor driving part 300 is constituted by an H-bridge circuit 320, which is illustrated here in a simple form in structure so as to facilitate easy understanding of operation of the H-bridge circuit 320. The H-bridge circuit 320 may further include a circulation diode, a resistor, a capacitor and the like when necessary. The H-bridge circuit 320 shown in FIG. 2 is provided with four n-channel junction FETs (Field Effect Transistors) 321-324 as switching elements, however, another type of transistors (e.g., IGBTs) may be used in place of the n-channel junction FETs.

Respective gates of nodes A, B, C and D are connected to corresponding terminals of a driver IC (not shown). Under the control of the motor control part 110, the driver IC is able to set an arbitrary one of the switching elements 321-324 in an ON or OFF state. Node E is connected to the power supply 200. When the driver IC sets the switching elements 321, 324 in the ON state, the electric brush motor 31 is driven to rotate in a forward direction. Alternatively, when the driver IC sets the switching elements 322, 323 in the ON state, the electric brush motor 31 is driven to rotate in a reverse direction. In this instance, the driver IC is able to control a current value supplied to the electric brush motor 31 by setting the switching element 322 in the ON state only for a duty-on time period of a duty ratio calculated by the motor control part 111 while keeping the switching element 323 normally set in the ON state.

A resistor 311 shown in FIG. 2 serves to detect a current flowing through the electric brush motor 31 and is set to have a small resistance value, such as 0.004Ω. The resistor 311 will be sometimes referred to as "shunt resistor". A current detecting circuit 310 shown in FIG. 2 detects a current value flowing through the resistor 311 to thereby detect a supply current value supplied to the electric brush motor 31. The current detecting circuit 310 outputs the detected supply current value to the ECU 100 connected to a node F.

Although in the seat belt device 10 according to the illustrated embodiment, the ECU 100 has been described as being configured to include at least the motor control part 110 and the failure determining part 120, the ECU 100 may be configured to further include the motor driving part 300, the voltage detecting part 400, and the vehicle state detecting part 500.

Figure 3:
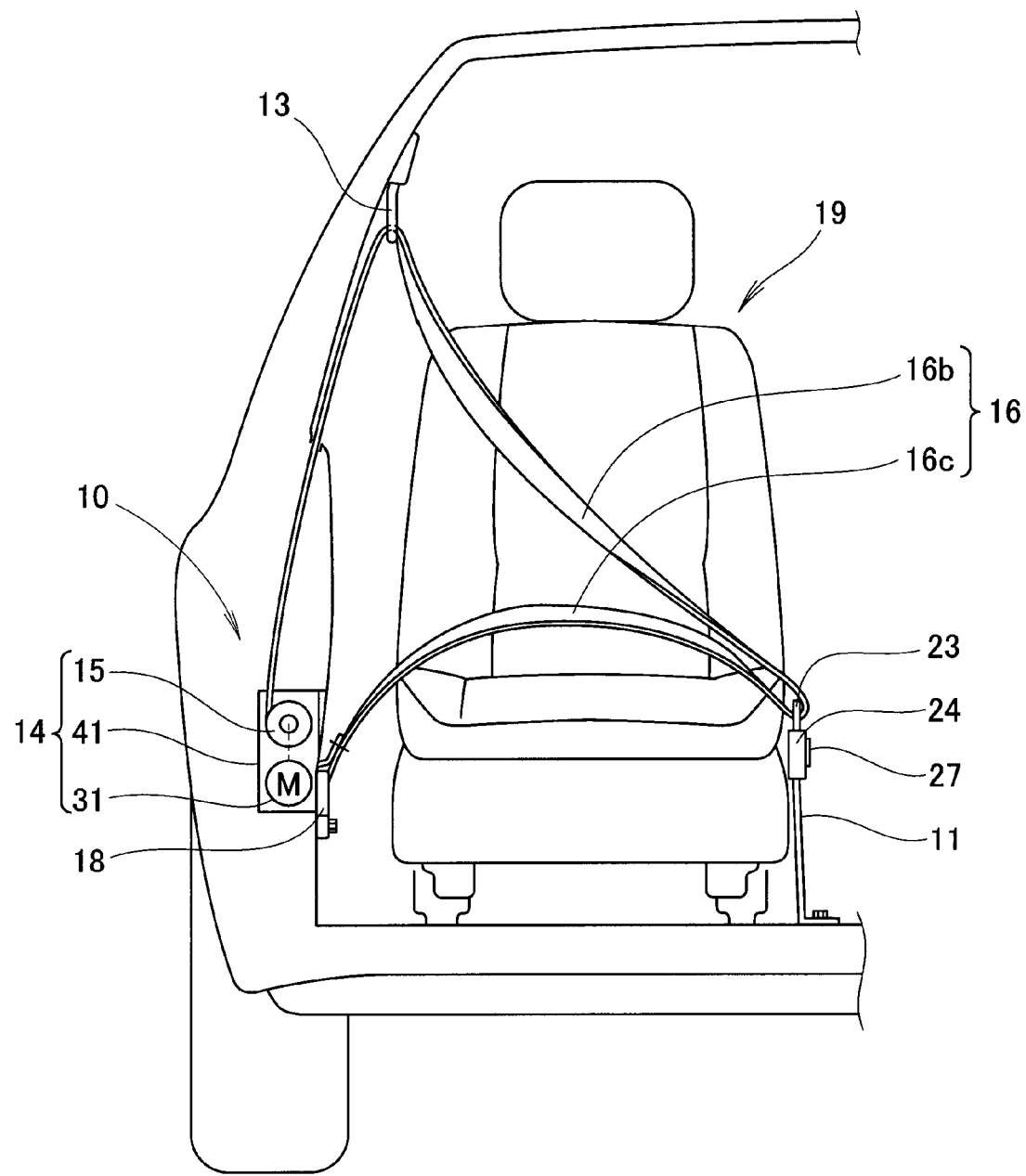
FIG. 3 is a front elevational view of a vehicle in which the seat belt device of FIG. 1 is incorporated.

FIG. 3 shows an example of a seat 19 which is equipped with the seat belt device 10 for appropriately restraining a passenger setting on the seat 19. The seat 19 shown in FIG. is a driver's seat, but the same seat belt device 10 is also provided for a front passenger seat (not shown). The seat belt device 10 include the retractor 14 provided on a side part of the vehicle body for winding the webbing 16 that is arranged to concurrently binding or restraining a shoulder and a waist of the passenger.

The seat belt device 10 is of the three-point support type wherein the webbing 16 is supported by three anchors, namely an upper anchor 13, a center anchor 11, and a lower anchor 18. The upper anchor 13 is provided at an upper portion of the side part of the vehicle body. The center anchor 11 is provided at a lower portion of the vehicle body on a side of the seat 19 which is opposite to the upper anchor 13. The lower anchor 18 is provided at a lower portion of the vehicle body on the same side as the upper anchor 13.

The webbing 16 includes a shoulder belt 16b for restraining one shoulder of the passenger and a lap belt 16c for restraining the waist of the passenger. A tongue 23 is provided at a fold-back part of the webbing 16 formed between the shoulder belt 16b and the lap belt 16c. The tongue 23 is configured to be detachably fitted in a buckle 24 with a single operation, the buckle 24 being fixedly mounted to the center anchor 11.

The buckle 24 has a buckle switch 27 incorporated therein. When the tongue 23 is fitted in the buckle 24, the buckle switch 27 outputs an ON signal. Alternatively, when the tongue 23 is not fitted in the buckle 24, the buckle switch 27 does not output the ON signal. The buckle switch 27 is connected to the ECU 100 shown in FIG. 1 so that a trigger signal is generated when the buckle switch 27 switches from an OFF state to an ON state or when the buckle switch 27 switches from the ON state to the OFF state.

Figure 4:
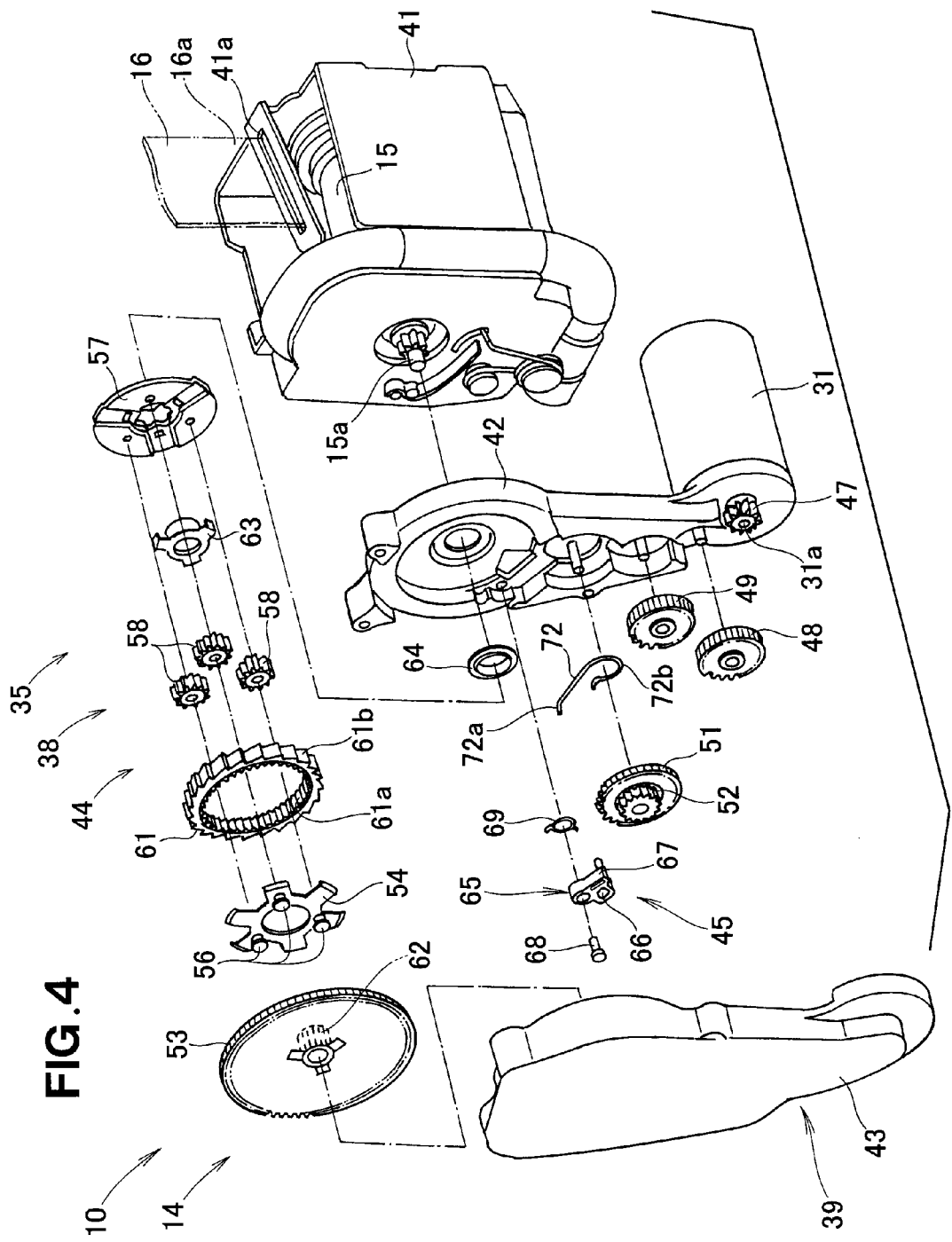
FIG. 4 is an exploded perspective view of a retractor of the seat belt device.

FIG. 4 is an exploded perspective view of the retractor 14 shown in FIG. 1. In the example shown in FIG. 4, the retractor 14 includes the frame 41 for attachment to the side part of the vehicle body, and the belt reel 15 rotatably mounted in the frame 41. The motor driving mechanism 35 is provided on an exterior side of the frame 41. The webbing 16 has one end attached to the belt reel 15, and one end side 16a of the webbing 16 is drawn out from the frame 41 through a draw-out opening 41a of the frame 41.

In the example shown in FIG. 4, the motor driving mechanism 35 has a gear housing 39 formed by an inner case 42 and an outer case 43. The electric brush motor 31 is mounted to the inner case 42 of the gear housing 39, and a reduction/clutch mechanism 38 connected to the electric brush motor 31 is housed in the gear housing 39. The reduction/clutch mechanism 38 includes a transmission mechanism 44 connecting the drive shaft 31a of the electric brush motor 31 to the belt reel 15, and a clutch mechanism 45 for selectively locking and unlocking the transmission mechanism 44 to keep the electric brush motor 31 and the belt reel 15 in an engaged state or an disengaged state.

The transmission mechanism 44 shown in FIG. 4 includes a driving gear 47 provided on the drive shaft 31a, a first intermediate gear 48 meshing with the driving gear 47, a second intermediate gear 49 meshing with the first intermediate gear 48, a third intermediate gear 51 meshing with the second intermediate gear 49, and a fourth intermediate gear 52 formed integrally with the third intermediate gear 51. The fourth intermediate gear 52 is arranged in such a manner as to mesh with a final gear 53.

The final gear 53 is rotatably mounted in the outer case 43 with a reduction plate 54 concentrically mounted with the final gear 53. The reduction plate 54 is attached to a carrier 57 via three pins 56, and three planetary gears 58 are rotatably supported on the respective pins 56. The planetary gears 58 are in mesh with internal gear teeth 61a of an internal gear 61, and a sun gear 62 formed integrally on the final gear 53 is in mesh with the planetary gears 58. The carrier 57 is connected to the shaft 15a of the belt reel 15. In the illustrated embodiment, bearings 63, 64 are provided for supporting the carrier 57.

In the example shown in FIG. 4, the clutch mechanism 45 includes a clutch member (clutch pawl) 65 rotatably mounted in the inner case 42 via a pawl pin 68, a return spring 69 provided on the pawl pin 68, a lever spring 72 mounted to a support shaft 71 (FIG. 5) of the third intermediate gear 51, and a stopper member 74 (FIG. 5) for positioning the clutch member 65 in a position to keep the electric brush motor 31 and the belt reel 15 in the disengaged state. The clutch member 65 has a locking pawl 67 lockingly engageable with a ratchet 61a formed on an outer circumferential surface of the internal gear 61. The lever spring 72 has a distal end portion 72a fitted in an engagement hole 66 of the clutch member 65.

Figure 5:
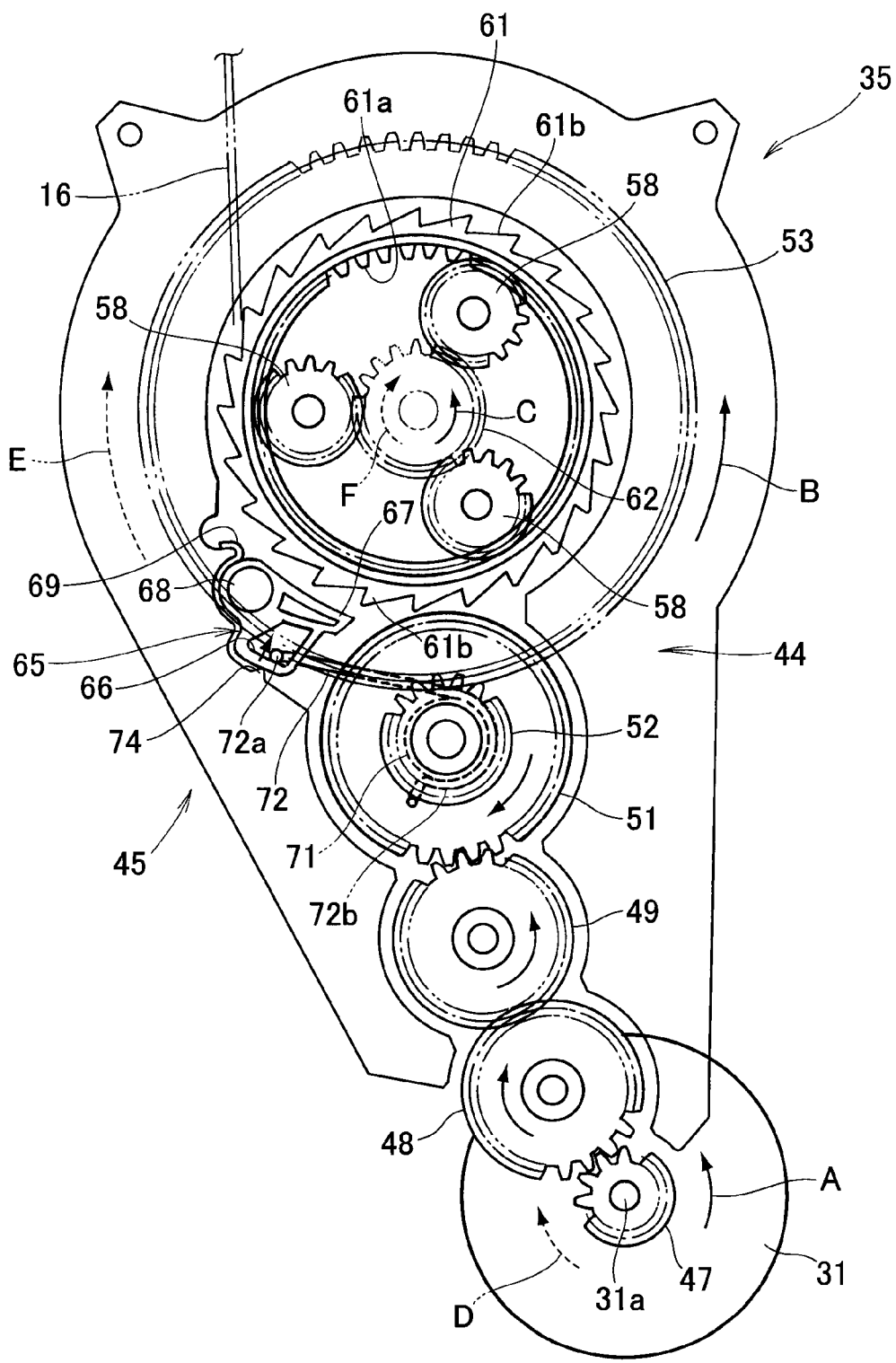
FIG. 5 is a view illustrative of a motor driving part of the retractor shown in FIG. 4.

FIG. 5 is a view illustrative of operation of the motor driving mechanism 35 shown in FIG. 4. When the motor driving mechanism 35 rotates the drive shaft 31a of the electric brush motor 31 in one direction (e.g., a counterclockwise direction) as indicated by arrow A, the driving gear 47 and the first to fourth intermediate gears 48, 49, 51, 52 rotate in directions indicated by solid-lined arrows, the final gear 53 rotates in a direction of arrow B, and the sun gear 62 rotates in a direction of arrow C.

Alternatively, when the motor driving mechanism 35 rotates the drive shaft 31a in an opposite direction (e.g., a clockwise direction) as indicated by broken-lined arrow D, the driving gear 47 and the first to fourth intermediate gears 48, 49, 51, 52 rotate in respective directions opposite to those indicated by the solid-lined arrows, the final gear 53 rotates in a direction of broken-lined arrow E, and the sun gear 62 rotates in a direction of broken-lined arrow F.

Figure 6:
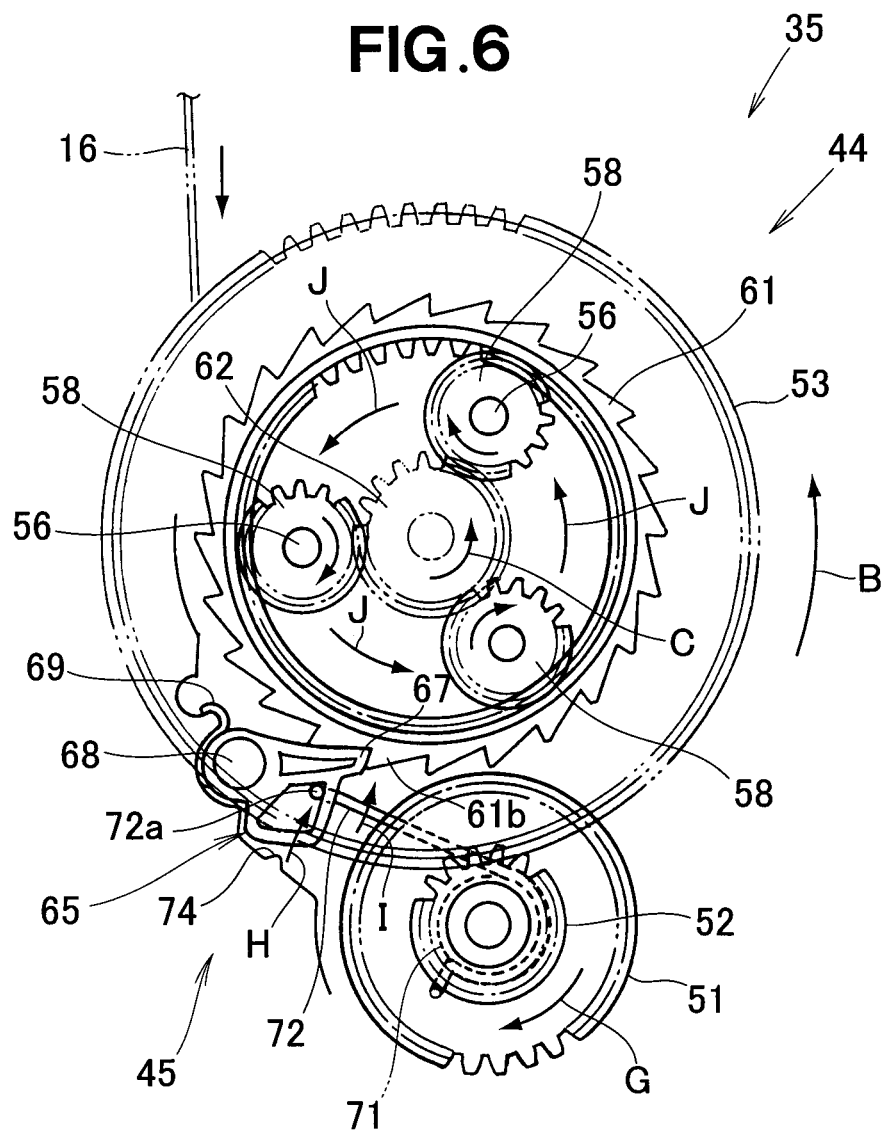
FIG. 6 is a view showing a clutch mechanism of the retractor as it is in an engaged state.

FIG. 6 is a view showing the clutch mechanism 45 of FIG. 4 as it is in the engaged state. For instance, when the electric brush motor 31 is driven to rotate in the one or counterclockwise direction such as shown in FIG. 5, the third intermediate gear 51 rotates in a direction of arrow G. In this instance, since the support shaft 71 also rotates in the direction of arrow G in unison with the third intermediate gear 51, the lever spring 72 is caused to swing in a direction of arrow H about the support shaft 71. With this swinging movement of the lever spring 72, the distal end 72a of the lever spring 72 urges the locking pawl 67 of the clutch member 65 toward the ratchet 61b against a bias or spring force of the return spring 69, whereby the clutch member 65 is caused to swing about the pawl pin 68 in a direction of arrow I until it arrives at an engaged position where the locking pawl 67 is in locking engagement with the racket 61b.

As understood from the foregoing, rotation of the electric brush motor 31 in one direction (for example, in the counterclockwise direction) causes the clutch member 65 to move in the engaged position where it is engaged with the transmission mechanism 44. Engagement of the locking pawl 67 with the racket 61b prevents the internal gear 61 from rotating in the counterclockwise direction.

Rotation of the fourth intermediate gear 52 in the direction of arrow G together with the third intermediate gear 51 causes the final gear 53 to rotate in the direction of arrow B. This causes the sun gear 62 to rotate in the direction of arrow C together with the final gear 53, and the planetary gears 58 rotate their own axes in a direction as indicated by the solid-lined arrows. Since the internal gear 61 is prevented from rotating in the clockwise direction, the planetary gears 58 revolve around the sun gear 62 in a direction of arrow J while rotating their own axes in the direction of solid-lined arrows. As the planetary gears 58 revolve in the direction of arrow J, the carrier 57 shown in FIG. 4 rotates in the counterclockwise direction. The belt reel 15 connected integrally with the carrier 57 rotates in the clockwise direction to thereby take up the webbing 16 therearound.

Figure 7:
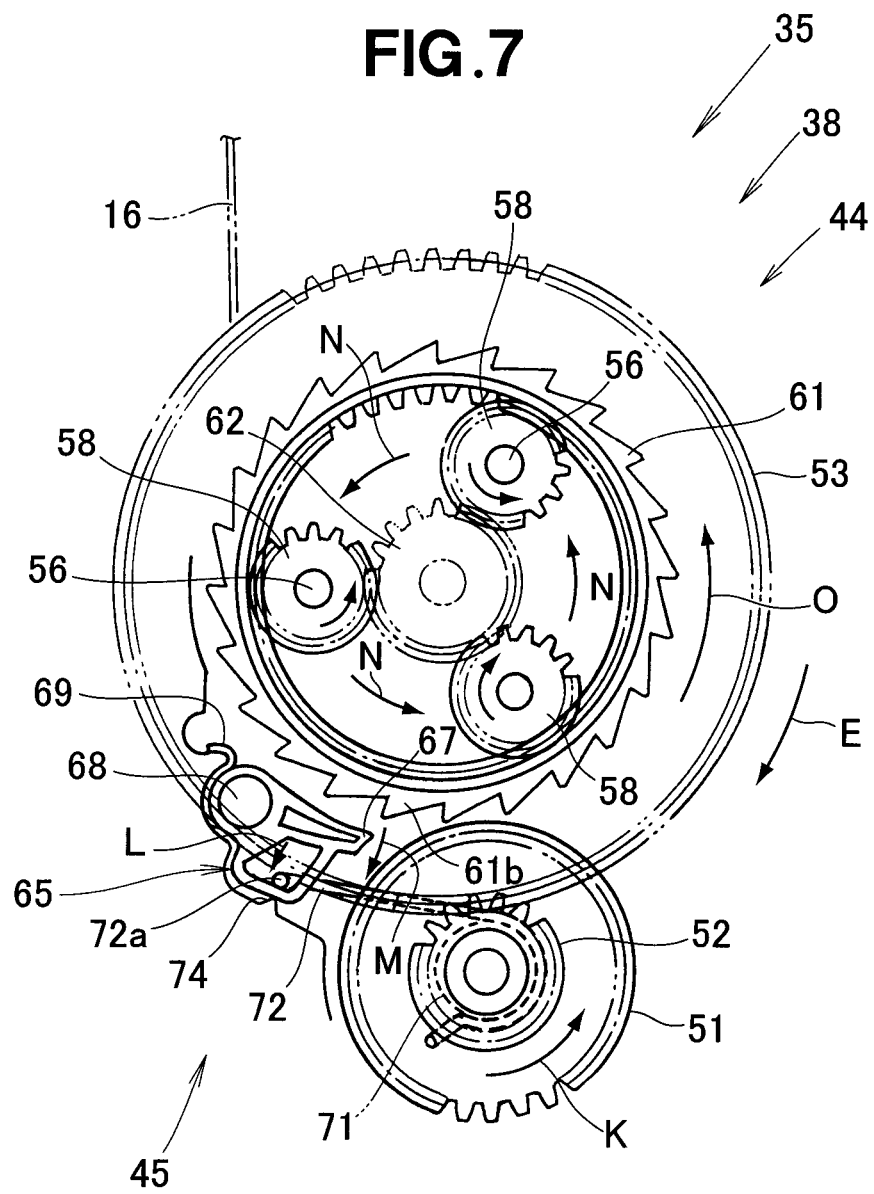
FIG. 7 is a view showing the clutch mechanism as it is in a disengaged state.

FIG. 7 is a view showing the clutch mechanism 45 of FIG. 4 as it is in the disengaged state. For instance, when the electric brush motor 31 is driven to rotate in the opposite or clockwise direction in FIG. 5, the third intermediate gear 51 rotates in a direction of arrow K. In this instance, since the support shaft 71 also rotates in the direction of arrow K in unison with the third intermediate gear 51, the lever spring 72 is caused to swing in a direction of arrow L about the support shaft 71. By the action of an urging force applied from the distal end 72a of the lever spring 72 to the clutch member 65 in combination with a spring force of the return spring 69, the clutch member 65 is turned about the pawl pin 68 in a direction separating from the ratchet 61b. Angular movement of the clutch member 65 in a direction of arrow M continues until the clutch member 65 reaches a disengaged position where the locking pawl 67 is disengaged from the ratchet 61b.

As understood from the foregoing description, rotation of the electric brush motor 31 in the opposite direction (for example, in the clockwise direction) causes the clutch member 65 to move in the disengaged position. In this instance, the clutch member 65 is in contact with the stopper member 74 and is positioned in the disengaged position by the stopper member 74. Upon disengagement of the locking pawl 67 from the racket 61b, the internal gear 61 is placed in a rotatable condition. In addition, by continuing clockwise rotation of the electric brush motor 31, the webbing 16 can be pulled out from the belt reel 15.

2. Operation

A failure determining process for the electric brush motor 31 of the seat belt device 10 according to the embodiment shown in FIG. 1 will be described in greater detail with reference to FIG. 8 onward, wherein a short-circuit failure diagnosing operation performed in relation to electric connection between the motor control part 110 of the ECU 100 and the electric brush motor 31 is exemplified.

(Embodiment 1)

Figure 8:
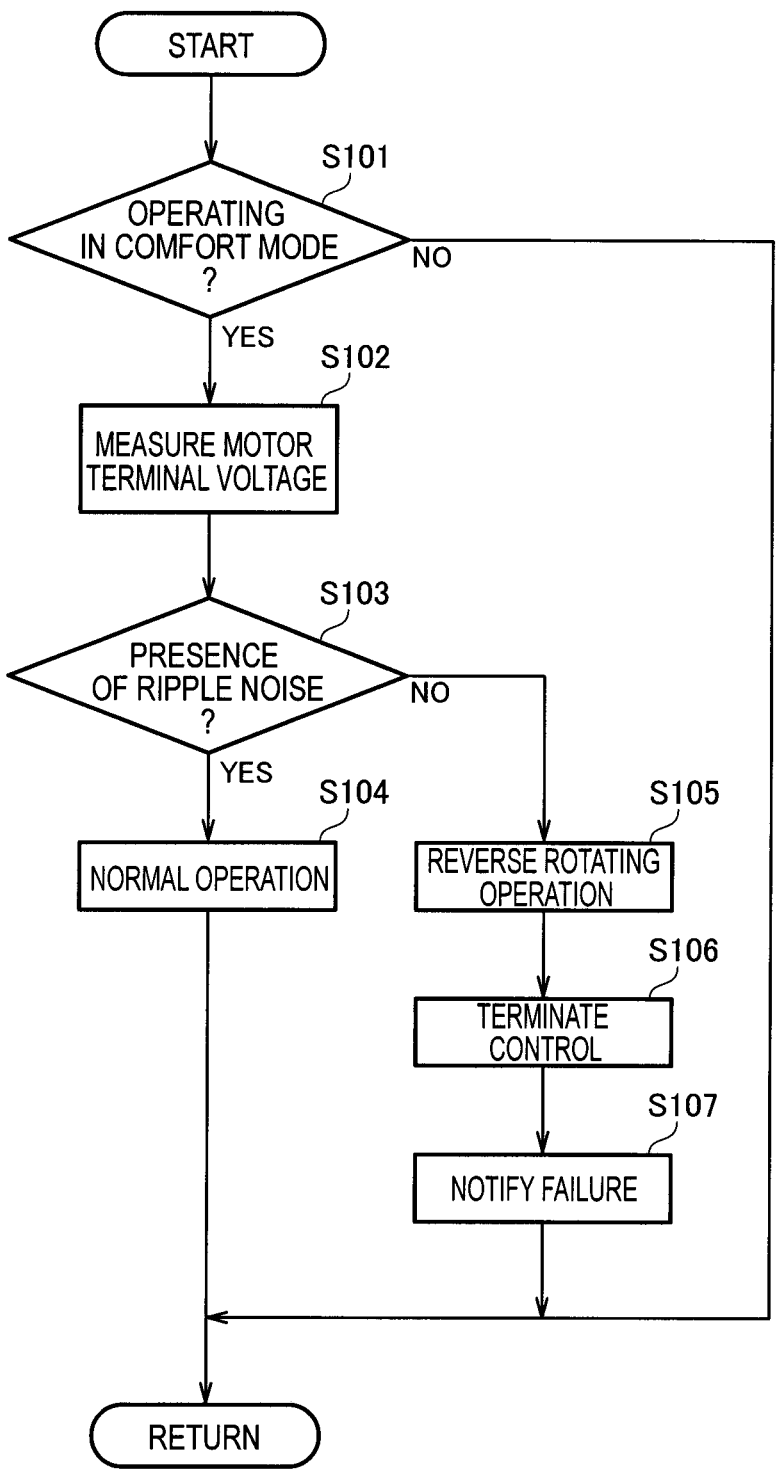
FIG. 8 is a flowchart showing a failure diagnosing process for an electric brush moor of the seat belt device according to Embodiment 1 of the present invention.

FIG. 8 is a flowchart showing a failure diagnosing process for the electric brush motor 31 according to Embodiment 1. In FIG. 8, the motor control part 110 of the ECU 100 first determines an operation mode of the vehicle based on an output from the vehicle state detecting part 500. More specifically, it is determined whether the vehicle is operating in a comfort mode in which the buckle has shifted from a non-fitted state to a fitted state and an action to take up a slack of the webbing has been detected in a condition where acceleration equal to or more than a predetermined value is not generated on the vehicle (Step S101).

Figure 11A:
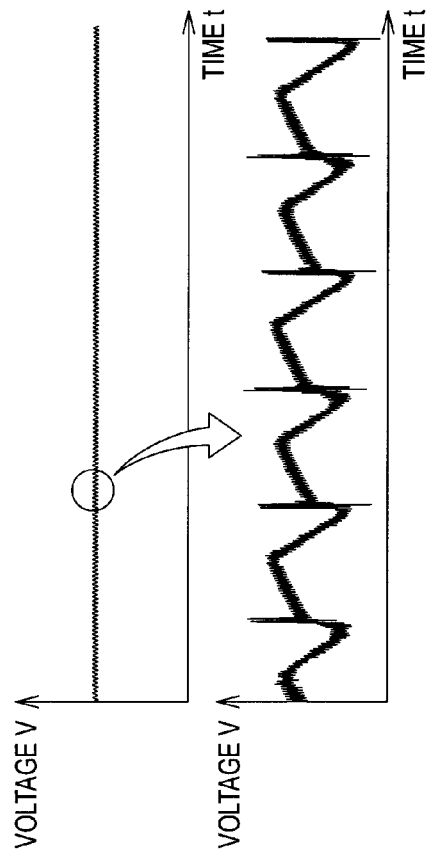
FIG. 11A is a waveform chart showing a terminal voltage of the electric brush motor before being subjected to a filtering process.
Figure 11B:
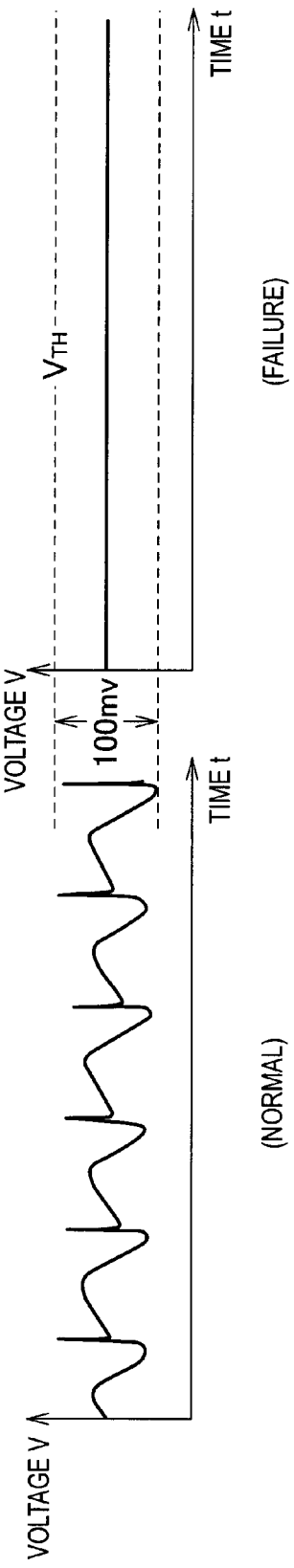
FIG. 11B is a waveform chart showing a terminal voltage of the electric brush motor after having been subjected to the filtering process.

When the motor control part 110 determines that the vehicle is operating in the comfort mode ("YES" determination in Step S101), the failure determining part 120 receives a terminal voltage of the electric brush motor 31 measured by the voltage detecting part 400 (Step S102) and determines the presence or absence of a ripple noise on the basis of a waveform of the received terminal voltage (Step S103). In this instance, the presence or absence of the ripple noise can be determined either by a comparison of a filtered waveform (obtained by filtering the waveform through an LPF, for example) with a threshold value, or by a frequency analysis of the waveform. FIG. 11A shows a voltage waveform of the electric brush motor 31 before being subjected to a filtering process, and FIG. 11B shows a voltage waveform of the electric brush motor 31 after having been subjected to the filtering process.

When the presence of a ripple noise is not detected ("NO" determination in Step S103), it is determined that the electric brush motor 31 has failed. Then, the motor control part 110 controls the motor driving part 300 to rotate the electric brush motor 31 in a direction to pull out the webbing 16 (reverse rotating operation) (Step S105). The purpose for which the motor control part 110 rotates the electric brush motor 31 in the direction to pull out the webbing 16 is to shift the clutch mechanism 45 from the engaged state (FIG. 6) to the disengaged state (FIG. 7) again.

In Step S105, the motor control part 110 is required to rotate the electric brush motor 31 in the direction to pull out the webbing 16 only for a very short time period (e.g., 200 ms). Then, the motor control part 110 terminates driving of the electric brush motor 31 (Step S106) and notifies an indicator (not shown) of a failure occurring in the electric brush motor 31 (Step S107), thereafter, operation of the motor control part 110 returns to Step S101. When the presence of a ripple noise is detected at Step S103 ("YES" determination in Step S103), the electric brush motor 31 is determined to be normal, and the motor control part 110 controls the motor driving part 300 as usual (Step 104). More specifically, the motor control part 110 sets a target current value and performs current feedback control so that a driving current value supplied to the electric brush motor 31 coincides with the target current value.

FIG. 11A shows a waveform before being subjected to a filtering process. The pre-filtered waveform is a voltage waveform pulse-width-modulated with a frequency of 20-30 kHz which is superimposed with a ripple noise (ripple voltage) caused by the structure (brushes) of the electric brush motor 31. The voltage waveform is shown on an axis representing the time, and a ripple noise having a voltage peak generated for every 1 kHz as a result of drive control of the electric brush motor 31. The failure determining part 120 performs a filtering operation on the pulse-width-modulated waveform using an LPF (low-pass filter) to thereby separate a ripple voltage and converts the pulse-width-modulated waveform into a voltage having no frequency component. The voltage is compared with a threshold value $V_{TH}$ to thereby determine the presence or absence of a short-circuit failure. For example, when the voltage is larger than the threshold value $V_{TH}$, the electric brush motor 31 is determined to be normal. Alternatively, when the voltage is equal to or smaller than the threshold value $V_{TH}$, the electric brush motor 31 is determined as failure.

The failure determination using comparison with the threshold value $V_{TH}$ may be replaced by a determination as to whether an average voltage appearing as a straight line is within a voltage range (e.g., 100 mV) defined between a maximum value and a minimum value. As a further alternative, a frequency analysis may be employed to determine the presence or absence of a ripple noise generated for each unit frequency of 1 kHz. The filtering operation is not limited to the one using the LPF but may include any other operation using a BPF (band-pass filter) and the like provided that the filtering operation can separate a ripple voltage.

When Step S101 determines that the vehicle is not operating in the comfort mode but in an emergency state such as a pre-crash state where acceleration equal to or more than the predetermined value is detected ("NO" determination in Step S101), the above-described failure diagnosing operation of the electric brush motor 31 is not executed. When the vehicle is in the emergency state, a large current flows through the electric brush motor 31 to take up the webbing 16 so that unexecution of the failure diagnosing operation is effective to prevent occurrence of a motor seizure. Current flowing in the comfort mode has a value of the order of several mA so that the current flowing through the electric brush motor 31 for detecting a ripple noise can only exert a negligible influence. When a short-circuit failure occurs at the time of pre-crash, winding of the webbing using an explosive powder is executed while winding of the webbing 16 by the electric brush motor 31 is kept disabled, and the indicator notifies the passenger of the occurrence of a pre-crash condition.

In the Embodiment 1, an open failure diagnosing operation is performed prior to the short-circuit failure diagnosing operation discussed above. One example of an open failure determination method will be described with reference to FIG. 9 which schematically shows an equivalent circuit of the H-bridge circuit 320 shown in FIG. 2. The equivalent circuit of the H-bridge circuit shown in FIG. 9 includes an electric brush motor 31, a resistor 360 connected in series with the electric brush motor 31, a resistor 370 connected in parallel with a circuit part including the electric brush motor 31 and the resistor 360, with a node H directly connected to a resistor 350 while another note I is being grounded. The equivalent circuit also includes a voltage detecting circuit 400a (not shown in FIG. 2) provided for detecting a voltage between the node H and the node I. The voltage detecting circuit 400a detects a voltage between the nodes H and I and outputs the detected voltage to the ECU 100 connected to a node J. The resistors 350, 360, 370 are not shown in FIG. 2 but schematically indicate a resistance value in the H-bridge circuit 320 as a load shown in FIG. 2.

Figure 9:
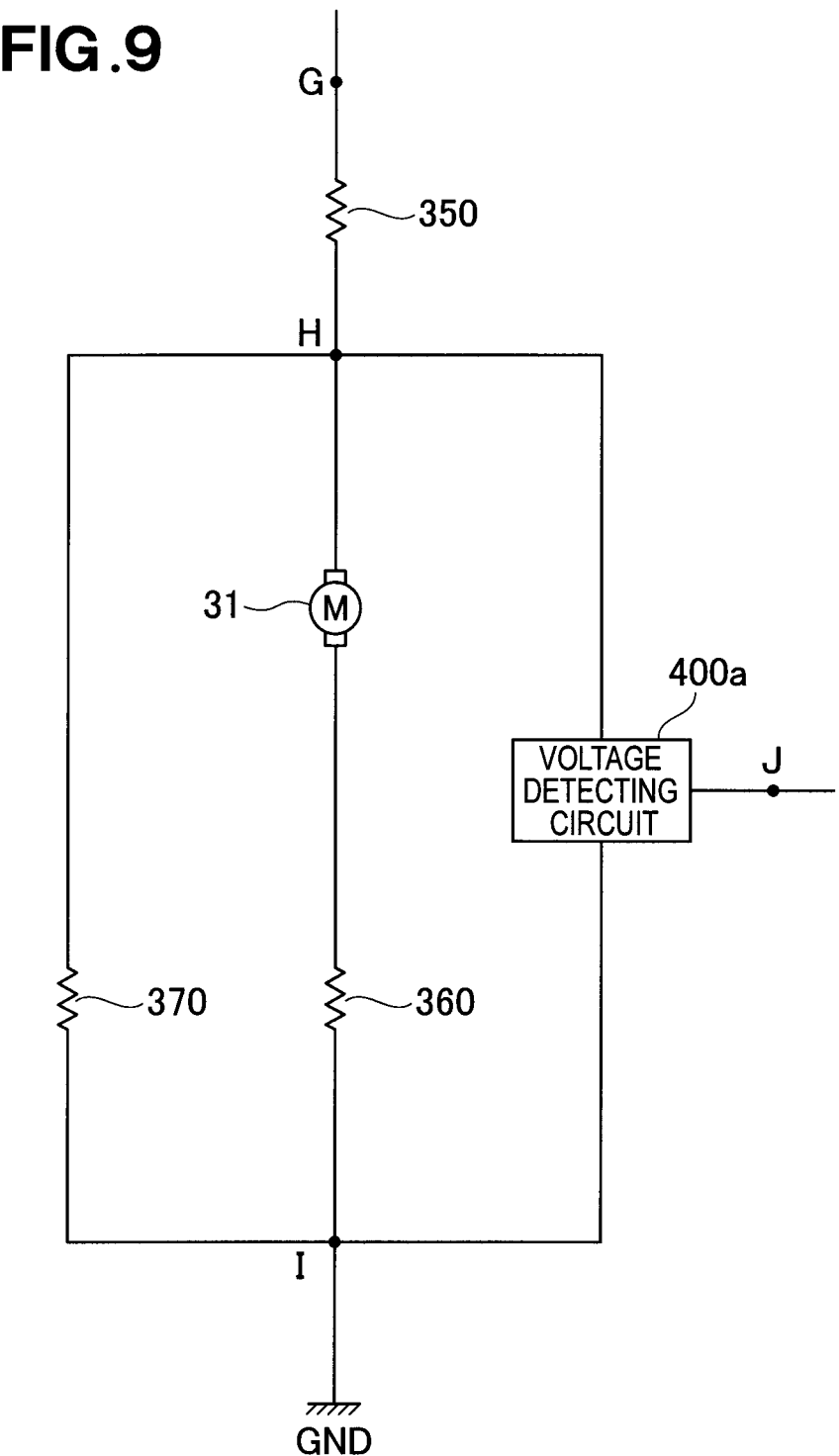
FIG. 9 is a circuit diagram showing an equivalent circuit of an H-bridge circuit shown in FIG. 2.

In the equivalent circuit shown in FIG. 9, the motor control part 110 of the ECU 100 applies a monitoring voltage between the node G and the ground GND. In this instance, the motor control part 110 monitors a voltage value applied between the node H and the node I shown in FIG. 9. When a voltage value between the node H and the node I detected by the voltage detecting circuit 400a exceeds a threshold value, the motor control part 110 determines that an open failure has occurred in the H-bridge circuit.

For example, if the resistors 350, 360 and 370 have a resistance value of 6.8 kΩ, a synthetic resistance value between the node G and the node I is 10.2 kΩ. Here, if the monitoring voltage applied between the node G and the ground GND is 5 V and when an open failure has not occurred in the H-bridge circuit, the voltage between the node H and the node I is about 1.7 V. Alternatively, when an open failure has occurred in the H-bridge circuit, current does not flow through the resistor 360 and, hence, the voltage between the node I and the node I is 2.5 V. The motor control part 100 determines that an open failure has occurred in the H-bridge circuit when the voltage detecting circuit 400a detects a voltage larger than 1.7 V. In the foregoing example of calculation, a resistance involved in the electric brush motor 31 is regarded as being included in the resistance value of the resistor 360.

(Advantageous Effects of Embodiment 1)

As thus far described, according to the seat belt device 10 of Embodiment 1, the ECU 100 (failure determining part 120) determines whether the electric brush motor 31 has failed or not on the basis of the presence or absence of a voltage having a frequency component caused by drive control of the electric brush motor 31 that is detected by the voltage detecting part 400 while the electric brush motor 31 is driven by the motor control part 110. With this arrangement, failure diagnosis is possible to perform in any timing as long as the electric brush motor 31 is being driven. This means that failure detection for the electric brush motor 31 can be conducted at increased frequency, and motor failure determination can be appropriately performed. It is therefore possible to avoid occurrence of an unwanted condition where the passenger cannot be restrained by the seat belt device due, for example, to a motor failure occurring when an emergency condition happens on the vehicle. The reliability of the seat belt device 10 can thus be increased.

According to the seat belt device 10 of Embodiment 1, the ECU 100 (failure determining part 120) determines whether the electric brush motor 31 has failed or not when the vehicle state detecting part 500 detects an action to fit the webbing 16 or an action to take up a slack of the webbing 16 in a condition where acceleration equal to or more than a predetermined value is not generated on the vehicle (comfort mode). With this arrangement, it is possible to prevent the electric brush motor 31 from being driven with a large current which would otherwise occur when the vehicle is in the pre-crash state. Furthermore, the ECU 100 (failure determining part 120) filters a ripple voltage detected by the voltage detecting part 400 and determines whether the electric brush motor 31 has failed or not on the basis of a waveform of the filtered voltage. With this arrangement, a failure diagnosis can be achieved at a reduced cost.

(Embodiment 2)

Figure 10:
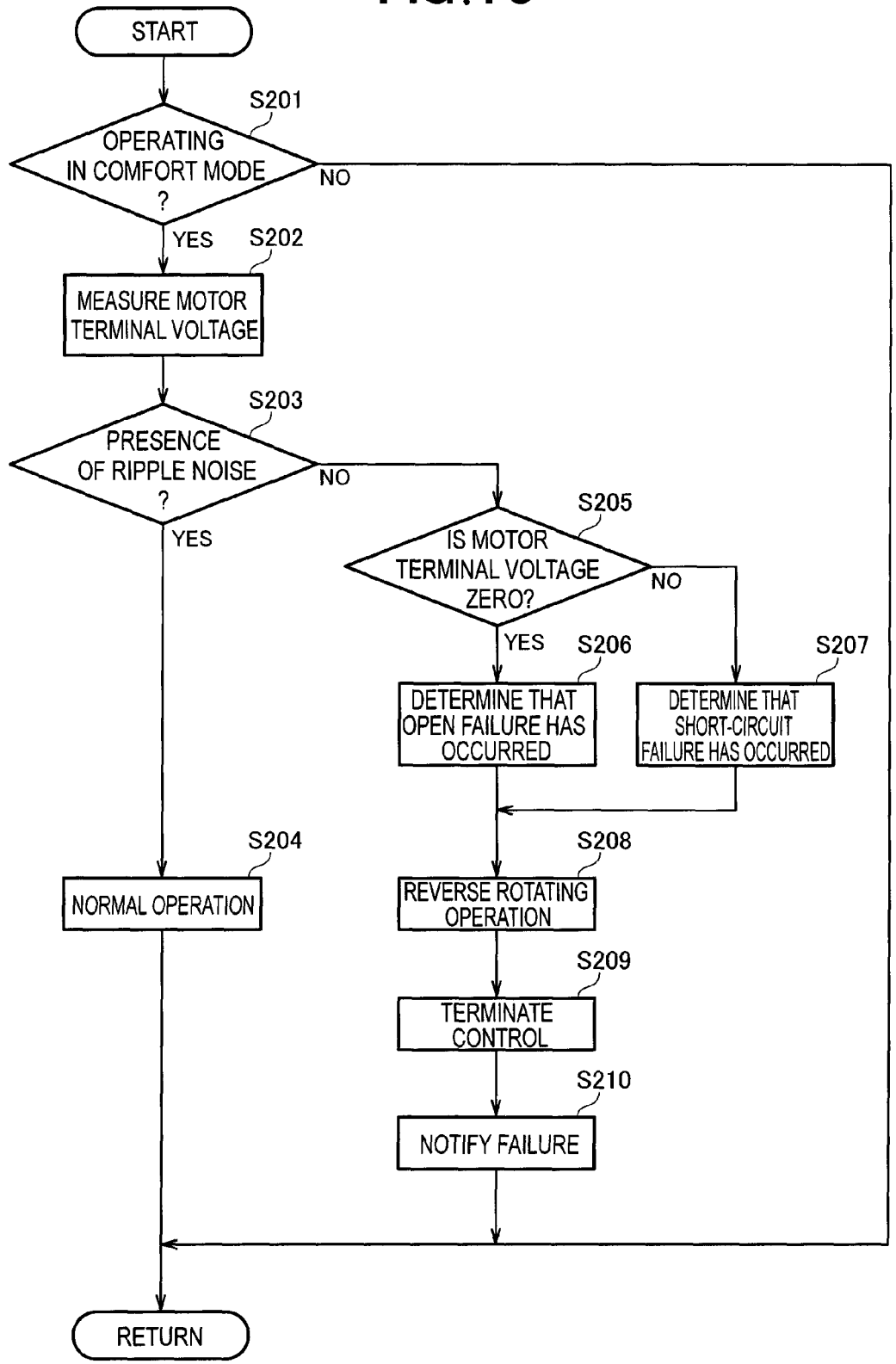
FIG. 10 is a flowchart showing a failure diagnosing process for the electric brush motor according to Embodiment 2 of the present invention.

FIG. 10 is a flowchart showing a failure diagnosing process for the electric brush motor 31 according to Embodiment 2. The motor control part 110 of the ECU 100 first determines an operation mode of the vehicle based on an output from the vehicle state detecting part 500 in the same manner as in Embodiment 1 (Step S201). When the motor control part 110 determines that the vehicle is operating in a comfort mode in which the buckle has shifted from a non-fitted mode to a fitted mode and an action to take up a slack of the webbing has been detected in a condition where acceleration equal to or more than a predetermined value is not generated on the vehicle ("YES" determination in Step S201), the failure determining part 120 receives a terminal voltage of the electric brush motor 31 measured by the voltage detecting part 400 (Step S202) and determines the presence or absence of a ripple noise on the basis of a waveform of the received terminal voltage (Step S203). The ripple-noise presence/absence determination is performed in the same manner as the one described above with reference to FIGS. 11A and 11B in conjunction with Example 1 and a further description will be omitted to avoid duplicate explanation.

When the presence of a ripple noise is not detected ("NO" determination in Step S203), the failure determining part 120 further determines whether the received terminal voltage of the electric brush motor 31 is zero or not in order to perform an open failure determination in relation to electric connection between the motor control part 110 of the ECU 100 and the electric brush motor 31 (Step S205). When the terminal voltage is zero ("YES" determination in Step S205), it is determined that an open failure has occurred (Step S206). Alternatively, when a constant voltage having a value larger than zero is detected ("NO" determination in Step S205), it is determined that a short-circuit failure has occurred (Step S207).

When the failure determining part 120 determined that an open failure or short-circuit failure has occurred, the motor control part 110 controls the motor driving part 300 to rotate the electric brush motor 31 in a direction to pull out the webbing 16 (reverse rotating operation) (Step S208). Then, the motor control part 110 terminates driving of the electric brush motor 31 (Step S209) and notifies an indicator (not shown) of a failure occurring in the electric brush motor 31 (Step S210), thereafter, operation of the motor control part 110 returns to Step S201.

When the presence of a ripple noise is detected at Step S203 ("YES" determination in Step S203), the electric brush motor 31 is determined to be normal, and the motor control part 110 controls the motor driving part 300 as usual (Step S204). More specifically, the motor control part 110 sets a target current value and performs current feedback control so that a driving current value supplied to the electric brush motor 31 coincides with the target current value.

(Advantageous Effects of Embodiment 2)

As thus far described, according to the seat belt device 10 of Embodiment 2, the ECU 100 (failure determining part 120) determines whether the electric brush motor 31 has failed or not on the basis of the presence or absence of a voltage having a frequency component caused by drive control of the electric brush motor 31 that is detected by the voltage detecting part 400 while the electric brush motor 31 is driven by the motor control part 110, in the same manner as in Embodiment 1. With this arrangement, failure diagnosis is possible to perform in any timing as long as the electric brush motor 31 is being driven. This means that failure detection for the electric brush motor 31 can be conducted at increased frequency, and motor failure determination can be appropriately performed. It is therefore possible to avoid occurrence of an unwanted condition where the passenger cannot be restrained by the seat belt device due, for example, to a motor failure occurring when an emergency condition happens on the vehicle. The reliability of the seat belt device 10 can thus be increased.

According to the seat belt device 10 of Embodiment 2, the ECU 100 (failure determining part 120) determines that a short-circuit failure has occurred in relation to connection between the electric brush motor 31 and the motor control part 110 when a constant ripple voltage larger than zero is detected by the voltage detecting part 400. The ECU 100 (failure determining part 120) also determines that an open failure has occurred in relation to connection between the motor control part 110 and the electric brush motor 31 when a voltage value of zero is detected by the voltage detecting part 400. When the presence of a ripple voltage is not detected, both a short-circuit failure diagnosis and an open failure diagnosis are possible to perform. As compared with the failure diagnosis of Embodiment 1 in which a short-circuit failure and an open failure are diagnosed independently and separately from one another, the failure diagnosis of Embodiment 2 can be achieved less costly, with increased efficiency, and in a relatively short time.

The current values, frequencies and times used in conjunction with the flowcharts shown in FIGS. 8 and 10 shall not be construed as limiting the nature of the invention but be construed as indicating examples only. All values described above may be set in advance during manufacture of the seat belt device 10 or altered by measurement or by the passenger according to his/her tastes.

Obviously, various minor changes and modifications of the present invention are possible in the light of the above teaching. It is therefore to be understood that within the scope of the appended claims the invention may be practiced otherwise than as specifically described.

What is claimed is:

1. A seat belt device comprising:
a belt reel on which a webbing is wound;
an electric brush motor for driving the belt reel;
a motor control part that performs drive control of the electric brush motor;
a voltage detecting part that detects a voltage generated between both terminals of the electric brush motor; and
a failure determining part that determines whether the electric brush motor has failed or not on the basis of the presence or absence of a ripple voltage having a frequency component caused by the drive control of the electric brush motor that is detected by the voltage detecting part while the electric brush motor is driven by the motor control part.

2. The seat belt device according to claim 1, wherein the failure determining part determines that a short-circuit failure has occurred in relation to connection between the electric brush motor and the motor control part when a constant ripple voltage larger than zero is detected by the voltage detecting part.

3. The seat belt device according to claim 1, wherein the failure determining part determines that an open failure has occurred in relation to connection between the motor control part and the electric brush motor when a voltage value of zero is detected by the voltage detecting part.

4. The seat belt device according to claim 1, wherein the failure determining part filters the ripple voltage and determines whether the electric brush motor has failed or not on the basis of a waveform of the filtered ripple voltage.

5. The seat belt device according to claim 2, wherein the failure determining part filters the ripple voltage and determines whether the electric brush motor has failed or not on a basis of a waveform of the filtered ripple voltage.

6. The seat belt device according to claim 3, wherein the failure determining part filters the ripple voltage and determines whether the electric brush motor has failed or not on a basis of a waveform of the filtered ripple voltage.

7. The seat belt device according to claim 1, further comprising a vehicle state detecting part that detects a state of a vehicle in which the seat belt device is incorporated, wherein the failure determining part determines whether the electric brush motor has failed or not when the vehicle state detecting part detects an action to fit the webbing or an action to take up a slack of the webbing in a condition where acceleration equal to or more than a predetermined value is not generated on the vehicle.

8. The seat belt device according to claim 7, wherein the failure determining part determines that a short-circuit failure has occurred in relation to connection between the electric brush motor and the motor control part when a constant ripple voltage larger than zero is detected by the voltage detecting part.

9. The seat belt device according to claim 7, wherein the failure determining part determines that an open failure has occurred in relation to connection between the motor control part and the electric brush motor when a voltage value of zero is detected by the voltage detecting part.

10. The seat belt device according to claim 7, wherein the failure determining part filters the ripple voltage and determines whether the electric brush motor has failed or not on the basis of a waveform of the filtered ripple voltage.

11. The seat belt device according to claim 8, wherein the failure determining part filters the ripple voltage and determines whether the electric brush motor has failed or not on a basis of a waveform of the filtered ripple voltage.

12. The seat belt device according to claim 9, wherein the failure determining part filters the ripple voltage and determines whether the electric brush motor has failed or not on a basis of a waveform of the filtered ripple voltage.

* * * * *